United States Patent
Tezuka et al.

(10) Patent No.: US 7,122,251 B2
(45) Date of Patent: Oct. 17, 2006

(54) RESIN COMPOSITION FOR PLATING SUBSTRATE AND RESIN MOLDING USING THE SAME, AND METAL PLATED PARTS

(75) Inventors: Kouichi Tezuka, Ube (JP); Seizo Fujii, Sagamihara (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 140 days.

(21) Appl. No.: 10/478,218

(22) PCT Filed: May 29, 2002

(86) PCT No.: PCT/JP02/05189

§ 371 (c)(1),
(2), (4) Date: Nov. 28, 2003

(87) PCT Pub. No.: WO02/102894

PCT Pub. Date: Dec. 27, 2002

(65) Prior Publication Data

US 2004/0152808 A1    Aug. 5, 2004

(30) Foreign Application Priority Data

May 31, 2001 (JP) .............................. 2001-165739
Nov. 12, 2001 (JP) .............................. 2001-346404

(51) Int. Cl.
*B32B 27/36* (2006.01)
(52) U.S. Cl. ...................... 428/412; 428/458; 428/461; 428/462; 428/457; 524/127; 524/141; 524/414; 524/504
(58) Field of Classification Search ................ 524/127, 524/414, 504, 141; 428/412, 457, 458, 462, 428/461
See application file for complete search history.

(56) References Cited

U.S. PATENT DOCUMENTS

| | | | |
|---|---|---|---|
| 6,150,443 A | 11/2000 | Nodera et al. | |
| 6,348,527 B1 | 2/2002 | Nodera | |
| 6,355,767 B1 * | 3/2002 | Takagi | 528/196 |
| 6,403,683 B1 * | 6/2002 | Kobayashi | 524/115 |
| 6,448,316 B1 | 9/2002 | Hirano et al. | |
| 6,448,324 B1 | 9/2002 | Nodera et al. | |
| 6,777,492 B1 * | 8/2004 | Nakai et al. | 525/80 |
| 6,780,917 B1 * | 8/2004 | Hashimoto et al. | 524/456 |

FOREIGN PATENT DOCUMENTS

| | | |
|---|---|---|
| CN | 1172130 A | 2/1998 |
| CN | 1174858 A | 3/1998 |
| JP | 58-67737 | 4/1983 |
| JP | 62-263247 | 11/1987 |
| JP | 8-193157 | 7/1996 |
| JP | 09-137055 | 5/1997 |
| JP | 10-060160 | 3/1998 |
| JP | 10-130485 | 5/1998 |
| JP | 10-298395 | 11/1998 |
| JP | 11-199768 | 7/1999 |
| JP | 2000-063649 | 2/2000 |
| JP | 2000-063650 | 2/2000 |
| JP | 2000-063652 | 2/2000 |
| JP | 2000-119504 | 4/2000 |
| JP | 2000-143962 | 5/2000 |
| JP | 2000-186193 | 7/2000 |
| JP | 2000-349486 | 12/2000 |
| WO | WO 01/23449 A1 * | 4/2001 |

OTHER PUBLICATIONS

Japanese Office Action for Japanese Patent Application No. 2001-165739 dated Feb. 21, 2006 with English Translation.

* cited by examiner

*Primary Examiner*—Peter D. Mulcahy
(74) *Attorney, Agent, or Firm*—Oblon, Spivak, McClelland, Maier & Neustadt, P.C.

(57) ABSTRACT

The resin composition for a platable substrate of the present invention comprises 100 parts by weight of a resin composition (C) comprising 10 to 60% by weight of a graft copolymer (A) prepared by graft polymerization of a rubbery polymer (A1) and a monomer component (A2) containing an aromatic alkenyl compound monomer unit (a) and a vinyl cyanide compound monomer unit (b) and 40 to 90% by weight of the other polymer (B) (provided that the total amount of the components (A) and (B) is 100% by weight), and 5 to 40 parts by weight of a phosphate ester flame retardant (D) having a molecular weight of more than 326 or 2 to 40 parts by weight of a red phosphorus flame retardant (D'). The resin composition for a platable substrate of the present invention is excellent in production stability such as moldability, dimensional stability, mechanical strength and plating properties, and is also environmentally friendly. Excellent plated parts having good thermal conductivity can be provided by forming a metal plating layer on a resin molded article obtained by molding the resin composition for a platable substrate using a plating treatment. The resulting plated parts are suitable for use as housings for laptop PC and portable devices.

7 Claims, No Drawings

RESIN COMPOSITION FOR PLATING SUBSTRATE AND RESIN MOLDING USING THE SAME, AND METAL PLATED PARTS

TECHNICAL FIELD

The present invention relates to a flame retardant resin composition for a platable substrate, a resin molded article formed thereof, and plated parts.

BACKGROUND ART

As materials for housings for laptop PCs and portable devices, unreinforced or fiber-reinforced flame retardant ABS and flame retardant PC-ABS have been exclusively used heretofore.

Recently, weight reduction and thickness reduction of devices have been strongly demanded and it has also been required for it to endure impacts and loads when carried in a bag. Therefore, it has become necessary to reduce the thickness and weight of the housing and to impart high impact resistance thereto. Thus, high rigidity and impact properties are required from a resin used as the material of the housing.

Also, the housing for these devices require electromagnetic wave shielding properties (hereinafter referred to as EMI shieldability). The method of imparting EMI shieldability includes, for example, a method of using a resin containing about 30% by weight or more of carbon fibers, a method of inserting a metal foil or a metal plate upon in-molding or assembly of a product, and a method of subjecting to electroless plating or conductive coating.

Among conventionally used materials, unreinforced flame retardant ABS and flame retardant PC-ABS cannot cope with recent thickness reduction because of poor rigidity. A glass fiber-reinforced material is insufficient in balance between rigidity and weight. In a carbon fiber-reinforced material, when using a resin containing about 30% by weight or more of carbon fibers, EMI shieldability can be obtained. However, there arises a problem in that carbon fibers are expensive and the material containing carbon fibers in an amount of less than 30% by weight must be subjected to another treatment so as to impart sufficient EMI shieldability. Large content of carbon fibers causes a problem in that the appearance of a resin molded article made of the material becomes poor.

Although laptop PCs and portable devices contain sources of heat, such as CPUs, a calorific value tends to increase because of the high density thereof. Also, because of thickness reduction of the housing, heat removal is considered to be an important problem.

A material having high thermal conductivity is preferably used. as the material of the housing to remove heat. Since a resin material generally has low thermal conductivity, other measures must be adopted to remove heat in order to use a housing made of the resin.

From an environmental point of view, it has been recently required to use a flame retardant material free from halogens such as chlorine or bromine, which copes with the trend toward German and Swedish Ecolabeling.

Under these circumstances, housings for laptop PC and portable devices are required to be light weight, have thin walls, high rigidity, high impact resistance, high thermal conductivity, EMI shieldability, and be mass productible, and also require the use of an environmentally friendly material.

As a method of obtaining a device housing which is light weight, and has high rigidity, good thermal conductivity, and low cost, Japanese Unexamined Patent Application, First Publication No. 2000-349486 proposes a housing wherein the surface of a resin molded article obtained by molding of a thermoplastic resin is subjected to metal plating.

However, the technique disclosed in Japanese Patent Application, First Publication No. 2000-349486 is considered to be insufficient from the following point of view with respect to the production of a housing which meets all performance requirements described above.

For example, in Example 5 of the publication, a halogen-free phosphate ester flame retardant is used as a flame retardant, but it has low molecular weight. Therefore, the flame retardant has a low melting point and is liable to vaporize (gasify) at high temperatures, and thus large amounts of gas are evolved during molding. Consequently, there arise problems in that evolved gas contaminates the mold surface and is deposited on the mold parting plane (mold deposit), resulting in poor productivity, and problems such as poor formation of a plating layer of plated parts, and poor appearance.

DISCLOSURE OF THE INVENTION

An object of the present invention is to provide a flame retardant resin composition for a platable substrate, which is excellent in production stability such as moldability, dimensional stability, mechanical strength, and platable properties, and is also environmentally friendly and is suited for use in the production of plated parts. Excellent platable properties as used herein means that a plated layer is free from plating blistering and has high plating adhesive strength, and also these performances are maintained even if the environmental temperature varies.

The present inventors have found that a composition prepared by mixing a specific resin composition with a phosphate ester flame retardant or red phosphorus flame retardant having a molecular weight of 326 or more is excellent in production stability such as moldability, dimensional stability, mechanical strength and platable properties, and is also capable of excellent production of plated parts which have not hitherto been obtained, and thus the present invention has been completed.

The resin composition for a platable substrate of the present invention comprises 100 parts by weight of a resin composition (C) comprising 10 to 60% by weight of a graft copolymer (A) prepared by graft polymerization of a rubber polymer (A1) and a monomer component (A2) containing an aromatic alkenyl compound monomer unit (a) and a vinyl cyanide compound monomer unit (b) and 40 to 90% by weight of the other polymer (B) (provided that the total amount of the components (A) and (B) is 100% by weight), and 5 to 40 parts by weight of a phosphate ester flame retardant (D) having a molecular weight of more than 326 or 2 to 40 parts by weight of a red phosphorus flame retardant (D').

BEST MODE FOR CARRYING OUT THE INVENTION

The present invention will now be described in detail.

The resin composition (C) used as the resin composition for a platable substrate of the present invention is composed of 10 to 60% by weight of a graft copolymer (A) prepared by graft polymerization of a rubber polymer (A1) and a monomer component (A2) and 40 to 90% by weight of the other polymer (B).

Examples of the rubber polymer (A1) include butadiene rubber, styrene-butadiene rubber, acrylonitrile-butadiene rubber, isoprene rubber, chloroprene rubber, butyl rubber, ethylene-propylene rubber, ethylene-propylene-non-conjugated diene rubber, acrylic rubber, epichlorohyrin rubber, diene-acrylic composite rubber and silicone-acrylic composite rubber. Among these polymers, butadiene rubber, styrene-butadiene rubber, acrylonitrile-butadiene rubber, acrylic rubber, diene-acrylic composite rubber and silicone-acrylic composite rubber are preferable because a molded article of the resulting composition is excellent in plating properties.

The diene component of the diene-acrylic composite rubber contains 50% by weight or more of butadiene. Specific examples thereof include butadiene rubber, styrene-butadiene rubber and acrylonitrile-butadiene rubber. The acrylic rubber component is an alkyl (meth)acrylate rubber. Examples of the composite structure of the diene-acrylic composite rubber include core shell form wherein a core layer made of a diene rubber is coated with an alkyl (meth)acrylate rubber, core shell form wherein a core layer made of an alkyl (meth)acrylate rubber is coated with a diene rubber, form wherein a diene rubber and an alkyl (meth)acrylate rubber are mutually entangled, and a copolymer form wherein a diene monomer unit and an alkyl (meth)acrylate monomer unit are arranged at random.

The silicone component of the silicone-acrylic composite rubber contains polyorganosiloxane as a main component and is preferably polyorganosiloxane having a vinyl polymerizable functional group. The acrylic rubber component is an alkyl (meth)acrylate rubber. Examples of the composite structure of the silicone-acrylic composite rubber include core shell form wherein a core layer is made of a polyorganosiloxane rubber and is coated with an alkyl (meth)acrylate rubber, core shell form wherein a core layer is made of an alkyl (meth)acrylate rubber and is coated with a polyorganosiloxane rubber, form wherein a polyorganosiloxane rubber and an alkyl (meth)acrylate rubber are mutually entangled, and form wherein a segment of polyorganosiloxane and a segment of polyalkyl (meth)acrylate are linearly and sterically bonded to form a network.

The acrylic rubber component in the diene-acrylic composite rubber and the silicone-acrylic composite rubber is composed of an alkyl (meth)acrylate (g) and a polyfunctional monomer (h).

Examples of the alkyl (meth)acrylate (g) include alkyl acrylates such as methyl acrylate, ethyl acrylate, n-propyl acrylate, n-butyl acrylate, and 2-ethylhexyl acrylate; and alkyl methacrylates such as hexyl methacrylate, 2-ethylhexyl methacrylate, and n-lauryl methacrylate. These compounds can be used alone, or two or more kinds thereof can be used in combination. Since the finally obtained resin composition for plating substrate is excellent in impact resistance and gloss, n-butyl acrylate is used particularly preferably.

Examples of the polyfunctional monomer (h) include allyl methacrylate, ethylene glycol dimethacrylate, propylene glycol dimethacrylate, 1,3-butylene glycol dimethacrylate, 1,4-butylene glycol dimethacrylate, triallyl cyanurate, and triallyl isocyanurate. These monomers can be used alone, or two or more kinds thereof can be used in combination.

Although the method of preparing the rubber polymer (A1) used in the present invention is not specifically limited, the polymer is usually prepared by the emulsion polymerization using a radical polymerization initiator because the particle diameter of the rubber polymer (A1) is easily controlled. An average particle diameter of the rubber polymer (A1) is not specifically limited, but is preferably from 0.1 to 0.6 μm so as to obtain a resin composition for a platable substrate which is excellent in plating properties and impact resistance. When the average particle diameter is less than 0.1 μm, impact resistance of the resin composition for a platable substrate deteriorates and plating blistering is likely to occur. On the other hand, when the average particle diameter exceeds 0.6 μm, plating adhesive strength decreases.

The content of the rubber polymer (A1) is preferably from 5 to 25% by weight based on the resin composition (C). When the content is within the above range, the resin molded article made of the resin composition for plating substrate is excellent in impact resistance and plating adhesive strength.

The monomer component (A2) used in the graft polymerization with the rubber polymer (A1) contains an aromatic alkenyl compound monomer unit (a) and a vinyl cyanide compound monomer unit (b) and, if necessary, a monomer unit (c) copolymerizable with these units. Although a composition ratio thereof is not specifically limited, the amount of the aromatic alkenyl compound monomer unit (a) is preferably from 50 to 90% by weight, the amount of the vinyl cyanide compound monomer unit (b) is preferably from 10 to 50% by weight, and the amount of the monomer unit (c) is preferably from 0 to 40% by weight (provided that the total amount of the components (a), (b) and (c) is 100% by weight). When the ratio is not within the above range, the resin composition for plating substrate is inferior in at least one of moldability and plating properties.

The aromatic alkenyl compound monomer unit (a) includes styrene, α-methylstyrene, and vinyltoluene, and is preferably styrene. The vinyl cyanide compound monomer unit (b) includes acrylonitrile and methacrylonitrile, and is preferably acrylonitrile.

Examples of the monomer unit (c) copolymerizable with them include methacrylate esters such as methyl methacrylate, ethyl methacrylate, and 2-ethylhexyl methacrylate; acrylate esters such as methyl acrylate, ethyl acrylate, and butyl acrylate; and maleimide compounds such as N-phenylmaleimide.

The graft copolymer (A) can be obtained by the graft polymerization of the rubber polymer (A1) with the monomer component (A2) which serves as a graft component. A known method can be applied to the graft polymerization and the method is not specifically limited. Upon the graft polymerization, various chain transfer agents can be used to adjust the molecular weight and graft ratio of the graft polymer.

The graft copolymer (A) preferably contains 70 to 99% by weight of an insoluble matter in an acetone solvent and a reduced viscosity of 0.30 to 0.70 dl/g as measured at 25° C. in a solution of the acetone soluble matter (0.2 g/dl) in N,N-dimethylformamide.

As used herein, the soluble matter in the acetone solvent is a non-grafted polymer composed only of the monomer component (A2), which is often produced upon graft copolymerization of the rubber polymer (A1) and the monomer component (A2) which serves as a graft component. Therefore, when using the graft copolymer (A) containing 70% by weight of the insoluble matter in the acetone solvent, 30% by weight of the residual non-grafted polymer is counted as the other copolymer (B).

The amount of the graft copolymer (A) in the resin composition (C) is from 10 to 60% by weight (based on 100% by weight of the total amount of the components (A) and (B)). When the amount is less than 10% by weight, the impact resistance and plating adhesive strength of the resin composition for plating substrate are lowered. On the other hand, when the amount exceeds 60% by weight, flame retardancy of the resin composition for a platable substrate deteriorates. More preferably, the amount is 25% by weight or less. When the amount of the graft copolymer (A) is less than 10% by weight or exceeds 60% by weight, thermal cycle properties of plated parts deteriorate. As used herein, thermal cycle properties are properties wherein blistering of the plating layer does not occur even if plated parts are used in an environment with alternating low and high temperature.

The other polymer (B) used in the present invention is not specifically limited, but is preferably selected from the group consisting of copolymer (B-1) composed of an aromatic alkenyl compound monomer unit (a), a vinyl cyanide compound monomer unit (b) and, if necessary, a vinyl monomer unit (c) copolymerizable therewith, polycarbonate resin (B-2), polyamide resin (B-3) and polyester resin (B-4) because the resin composition for a platable substrate is excellent in moldability and mechanical strength. These polymers can be used alone, or two or more kinds thereof can be used in combination.

Specific examples of the copolymer (B-1) include styrene-acrylonitrile copolymer (SAN resin), α-methylstyrene-acrylonitrile copolymer, styrene-α-methylstyrene-acrylonitrile copolymer, styrene-acrylonitrile-methyl methacrylate copolymer, styrene-acrylonitrile-N-phenylmaleimide copolymer, and styrene-acrylonitrile-maleic anhydride copolymer.

The content of the aromatic alkenyl compound monomer unit (a) in the copolymer (B-1) is preferably within a range from 50 to 90% by weight, and more preferably from 60 to 80% by weight. The content of the vinyl cyanide compound monomer unit (b) in the copolymer (B-1) is preferably within a range from 10 to 50% by weight, and more preferably from 20 to 40% by weight. When each content of these units is within the above range, the resulting resin composition for a platable substrate is excellent in moldability and plating properties.

When using the vinyl compound monomer unit (c), the content is preferably 40% by weight or less. When the content exceeds 40% by weight, the resin composition for plating substrate is sometimes insufficient in moldability and plating properties.

The molecular weight of the copolymer (B-1) is not specifically limited, but a reduced viscosity as measured at 25° C. in a N,N-dimethylformamide (0.2 g/dl) solution is preferably from 0.4 to 1.4 dl/g.

The polycarbonate resin (B-2) is obtained from dihydroxydiarylalkane and may be optionally branched. The polycarbonate resin (B-2) is prepared by a known method and is generally prepared by reacting a dihydroxy or polyhydroxy compound with a phosgene or a diester of carbonic acid.

Preferable dihydroxydiarylalkane has an alkyl group at the ortho-position with regard to a hydroxy group. Specific examples thereof include 4,4-dihydroxy-2,2-diphenylpropane (=bisphenol A), tetramethyl bisphenol A, and bis-(4-hydroxyphenyl)-p-diisopropylbenzene.

The branched polycarbonate can be prepared by substituting a portion, for example, 0.2 to 2% by mole of a dihydroxy compound with polyhydroxy. Specific examples of the polyhydroxy compound include fluoroglycinol, 4,6-dimethyl-2,4,6-tri-(4-hydroxyphenyl)-heptene, 4,6-dimethyl-2,4,6-tri-(4-hydroxyphenyl)-heptane, and 1,3,5-tri-(4-hydroxyphenyl)-benzene.

The molecular weight of the polycarbonate resin (B-2) is not specifically limited, but is preferably from 15000 to 35000 in terms of a viscosity average molecular weight (Mv).

As the polyamide resin (B-3), a 3- or polymembered lactam, polymerizable ω-amino acid, or polyamide obtained by polycondensation of dibasic acid and diamine can be used.

Examples thereof include polymers such as ε-caprolactam, aminocaproic acid, enantholactam, 7-aminoheptanoic acid, 11-aminoundecanoic acid, and 9-aminonanoic acid; polymers obtained by polycondensation of diamines such as hexamethylenediamine, nonamethylenediamine, undecamethylenediamine, dodecamethylenediamine and metaxylenediamine, and dicarboxylic acids such as terephthalic acid, isophthalic acid, adipic acid, sebacic acid, dodecane dibasic acid and glutaric acid; and copolymers thereof. Specific examples thereof include nylon 6, nylon 11, nylon 12, nylon 4,6, nylon 6,6, nylon 6,10, and nylon 6,12.

The polyester resin (B-4) contains 50% by weight of a component composed mainly of an aromatic dicarboxylic acid having 8 to 22 carbon atoms and an alkylene glycol or cycloalkylene glycol having 2 to 22 carbon atoms and optionally contains a small amount of an aliphatic dicarboxylic acid such as adipic acid or sebacic acid as a constituent unit. Also, it may contain a polyalkylene glycol such as polyethylene glycol or polytetramethylene glycol as a constituent unit. Examples of particularly preferable polyester resin include polyethylene terephthalate, polybutylene terephthalate, polytetramethylene terephthalate, and polybutylene naphthalate. These polyester resins are used alone, or two or more kinds thereof are used in combination.

As the other polymer (B), the above-described copolymer (B-1), polycarbonate resin (B-2), polyamide resin (B-3) and polyester resin (B-4) may be used alone, or two or more kinds thereof may be used in combination. Examples thereof include combinations of two kinds of polymers, for example, styrene-acrylonitrile copolymer (SAN resin, B-1) and polycarbonate resin (B-2), SAN resin (B-1) and polyamide resin (B-3), SAN resin (B-1) and polyester resin (B-4), and polycarbonate resin (B-2) and polyester resin (B-4); and combinations of three kinds of polymers, for example, SAN resin (B-1), polycarbonate resin (B-2) and polyester resin (B-4). Among these combinations, combination of SAN resin (B-1) and polycarbonate resin (B-2) and combination of SAN resin (B-1), polycarbonate resin (B-2) and polyester resin (B-4) are preferable and the resulting resin composition for plating substrate is excellent in balance between moldability and mechanical strength.

The content of the other polymer (B) in the resin composition (C) is from 40 to 90% by weight, and preferably from 50 to 80% by weight (based on 100% by weight of the total amount of the components (A) and (B)).

When two or more kinds of polymers are used in combination as the other polymer (B), the other polymer (B) preferably contains the copolymer (B-1), polycarbonate resin (B-2), polyamide resin (B-3) and polyester resin (B-4) in the following composition ratio.

When the styrene-acrylonitrile copolymer (SAN resin, B-1) and the polycarbonate resin (B-2) are used in combination as the other polymer (B), the other polymer (B) preferably contains 1 to 65% by weight of the copolymer (B-1) and 35 to 99% by weight of the polycarbonate resin (B-2) (provided that the total amount of the components (B-1) and (B-2) is 100% by weight.

When the SAN resin (B-1) and the polyamide resin (B-3) are used in combination as the other polymer (B), the other polymer (B) preferably contains 10 to 50% by weight of the copolymer (B-1) and 50 to 90% by weight of the polyamide resin (B-3) (provided that the total amount of the components (B-1) and (B-3) is 100% by weight).

When the SAN resin (B-1) and the polyester resin (B-4) are used in combination as the other polymer (B), the other polymer (B) preferably contains 15 to 55% by weight of the copolymer (B-1) and 45 to 85% by weight of the polyester resin (B-4) (provided that the total amount of the components (B-1) and (B-4) is 100% by weight).

When the polycarbonate resin (B-2) and the polyester resin (B-4) are used in combination as the polymer (B), the polymer (B) preferably contains 25 to 85% by weight of the polycarbonate resin (B-2) and 15 to 75% by weight of the polyester resin (B-4) (provided that the total amount of the components (B-2) and (B-4) is 100% by weight).

When the SAN resin (B-1), the polycarbonate resin (B-2) and the polyester resin (B-4) are used in combination as the polymer (B), the polymer (B) preferably contains 1 to 69% by weight of the copolymer (B-1), 30 to 98% by weight of the polycarbonate resin (B-2) and 1 to 69% by weight of the polyester resin (B-4) (provided that the total amount of the components (B-1), (B-2) and (B-4) is 100% by weight).

When each content of these polymers (B-1) to (B-4) is adjusted with the above range, the resulting resin composition for a platable substrate is excellent in balance between moldability, mechanical strength, and plating properties.

When two or more kinds of these polymers are used in combination as the other polymer (B), the content of the other polymer (B) in the resin composition (C) is from 40 to 90% by weight (based on 100% by weight of the total amount of the components (A) and (B)).

The resin composition for plating substrate of the present invention is obtained by mixing 100 parts by weight of the resin composition (C) with a phosphate ester flame retardant (D) or red phosphorus flame retardant (D') having a molecular weight of more than 326.

As the phosphate ester flame retardant (D), there can be used known phosphate ester flame retardants having a molecular weight of more than 326, for example, phosphate ester flame retardants manufactured by Akzo Nobel K. K., Asahi Denka Co., Ltd., Ajinomoto-Fine-Techno Co., Inc., Albemarle Asano Corp., Great Lakes Chemical Corporation Japan, and DAIHACHI CHEMICAL INDUSTRY CO., LTD.

The phosphate ester flame retardant (D) constituting the resin composition of the present invention includes phosphate ester compounds represented by the following formula, but is not specifically limited, with the exception of a molecular weight of more than 326.

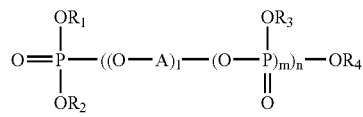

wherein $R_1$ to $R_4$ each independently represents a hydrogen atom or an organic group, excluding the case of $R_1=R_2=R_3=R_4=H$, A represents a di- or polyvalent organic group, l represents 0 or 1, m represents an integer of 1 or more, and n represents an integer of 0 or more.

In the above formula, the organic group is an alkyl group, cycloalkyl group or aryl group which may be substituted or not. In the case of being substituted, examples of the substituent include, but are not limited to, alkyl group, cycloalkyl group, alkoxyl group, alkylthio group, aryl group, aryloxy group, and arylthio group. Also the substituent may be a group as a combination of these substituents (for example, arylalkoxylalkyl group) or a group as a combination of these substituents and oxygen atom, nitrogen atom, sulfur atom or the like (for example, arylsulfonylaryl group). The di- or polyvalent organic group means a di- or polyvalent group which is obtained by eliminating one or more hydrogen atoms bonded to carbon atoms from the organic group. Examples thereof include alkylene group, (substituted)phenylene group, and multinucleated phenols (for example, those described from bisphenol A) and the relative position of two or more free valencies is any position. Particularly preferable examples thereof include diol compounds of its precursor, such as hydroquinone, resorcinol, diphenylolmethane, diphenyloldimethylmethane, dihydroxybiphenyl, p,p'-dihydroxydiphenylsulfone, and dihydroxynaphthalene.

Specific examples of the phosphate ester compound include trioctyl phosphate, tributoxyethyl phosphate, tricresyl phosphate, trixyl phosphate, cresyldiphenyl phosphate, xyldiphenyl phosphate, octyldiphenyl phosphate, diphenyl-2-ethylcresyl phosphate, tris(isopropylphenyl) phosphate, resorcinyl diphenyl phosphate, bisphenol A-bis(dicresyl phosphate) wherein $R_1$ to $R_4$ each represents an alkoxy (for example, methoxy, ethoxy, or propoxy) or (substituted) phenoxy (for example, phenoxy or methyl(substituted)phenoxy), such as bisphenol A bisphosphate, hydroquinonebisphosphate, resorcin bisphosphate, or trioxybenzenetriphosphate, and poly phosphate such as phenylenebis(diphenyl phosphate), phenylenebis(ditolyl phosphate), or phenylenebis(dixylyl phosphate). These compounds can be used alone, or two or more kinds thereof can be used in combination. Among these compounds, trixyl phosphate, phenylenebis(diphenyl phosphate), phenylenebis(dixylyl phosphate), phenylenebis(ditolyl phosphate) and bisphenol A-bis(dicresyl phosphate) are preferable and phenylenebis(diphenyl phosphate) and phenylenebis(dixylyl phosphate) are more preferable.

Since the phosphate ester flame retardant (D) having a molecular weight of more than 326 is hardly vaporized, it is not gasified during molding and a resin molded article having excellent appearance can be obtained. The molecular weight is more preferably 368 or more, and still more preferably 686 or more. The phosphate ester flame retardant is an environmentally friendly flame retardant because it is not a halogen compound.

The amount of the phosphate ester flame retardant (D) is from 5 to 40 parts by weight. When the amount is less than 5 parts by weight, the resin composition for a platable substrate is insufficient in flame retardancy. On the other hand, when the amount exceeds 40 parts by weight, heat resistance and impact resistance are impaired. The amount is preferably within a range from 6 to 35 parts by weight, and more preferably from 7 to 30 parts by weight.

In addition to the phosphate ester flame retardant (D), the resin composition (C) may contain a known non-halogen flame retardant. Examples of the non-halogen flame retardant include inorganic flame retardant, for example, aluminum hydroxide.

The resin composition for a platable substrate of the present invention may comprise 100 parts by weight of the resin composition (C) and a red phosphorus flame retardant (D') in place of the phosphate ester flame retardant (D)

As the red phosphorus flame retardant (D'), for example, known red phosphorus flame retardants manufactured by Nippon Chemical Industrial CO., LTD. and RINKAGAKU KOUGYO CO., LTD. can be used. Preferably, the red phosphorus flame retardant is stabilized by coating with a thermosetting resin, or a thermosetting resin and a metal hydroxide and examples thereof include "LP series" and "EP series" manufactured by Nippon Chemical Industrial CO., LTD., and "NOVA RED series" and "EXCEL series" manufactured by RINKAGAKU KOUGYO CO., LTD. The red phosphorus flame retardant (D') is hardly vaporized, it is not gasified during molding and a resin molded article having excellent appearance can be obtained. The red phosphorus flame retardant is an environmentally friendly flame retardant because it is not a halogen compound.

The amount of the red phosphorus flame retardant (D') is from 2 to 40 parts by weight. When the amount of the phosphorus flame retardant (D') is less than 2 parts by weight, flame retardancy of the resin composition for a platable substrate deteriorates. On the other hand, when the amount exceeds 40 parts by weight, impact resistance is imparted. The amount is preferably within a range from 3 to 30 parts by weight. Since the red phosphorus flame retardant (D') alone has ignition quality, it is preferably to be mixed previously with at least one of the graft copolymer (A) and/or the other polymer (B) to form a masterbatch.

In addition to the red phosphorus flame retardant (D'), the resin composition (C) may contain a known non-halogen flame retardant. Examples of the non-halogen flame retardant include phosphate flame retardants, for example, phosphate esters such as resorcinol(diphenyl) phosphate, triallyl phosphate, and aromatic phosphate ester. Also inorganic flame retardants such as aluminum hydroxide can be used.

The composition of the present invention can contain auxiliary flame retardants, for example, a compound containing polytetrafluoroethylene or tetrafluoroethylene, or a silicone polymer in order to prevent dripping during combustion. When using the compound containing polytetrafluoroethylene or tetrafluoroethylene, the amount is preferably 0.5 parts by weight or less based on 100 parts by weight of the resin composition (C).

The resin composition for a platable substrate of the present invention may contain an inorganic filler (E) in an amount within a range from 0.1 to 50 parts by weight, and preferably from 10 to 30 parts by weight, based on 100 parts by weight of the resin composition (C). When the amount is less than 0.1 parts by weight, sufficient effect of improving properties such as rigidity and thermal conductivity by the addition of the inorganic filler (E) cannot be obtained. On the other hand, when the amount exceeds 50 parts by weight, moldability sometimes become insufficient.

Examples of the inorganic filler (E) include inorganic fibers such as glass fibers and carbon fibers; inorganic fibers coated with metal; inorganic materials such as wollastonite, talc, mica, glass flakes, glass beads, potassium titanate, calcium carbonate, magnesium carbonate, carbon black, and ketjen black; metals such as iron, copper, zinc, and aluminum, and alloys thereof; and fibers and powders made of oxides thereof. These inorganic fillers can be used alone, or two or more kinds thereof can be used in combination. It is particularly preferable to use carbon fibers because high rigidity can be obtained by using them in a small amount.

If necessary, the resin composition for a platable substrate of the present invention can contain various additives such as other modifiers, releasants, photo- and thermal stabilizers, auxiliary flame retardant, antistatic agents, and dyes and pigments.

The resin composition for a platable substrate of the present invention can be kneaded and extruded by a conventional known kneader, and can be molded into a resin molded article by a conventional known molding method. Examples of the molding method include injection molding method, injection compression molding method, extrusion method, blow molding method, vacuum molding method, compressed air molding method, calendering method, and inflation molding method. Among these methods, injection molding method and injection compression molding method are preferable because there can be obtained a resin molded article which is excellent in mass productivity and has high dimensional stability.

An average wall thickness of the resin molded article obtained by molding the resin composition for a platable substrate of the present invention varies depending on the applications and shape of the product, but is usually from 0.5 to 5.0 mm. In the case of the housing for portable devices, which requires thickness and weight reduction, the average wall thickness is usually from 0.5 to 1.5 mm.

Plated parts comprising a metal plating layer formed on the surface can be obtained by optionally subjecting the resin molded article to a surface roughening treatment, then to a known electroconductive treatment and an electroplating treatment. The resulting plated parts are excellent in EMI shieldability, rigidity, impact resistance, and thermal conductivity.

The surface roughening treatment is conducted to prevent poor peeling of the metal plating layer from the resin molded article and a known method can be used. In the case in which the other polymer (B) contained in the resin composition for a platable substrate contains a copolymer (B-1), that is, it is a copolymer (B-1) alone, or a polymer alloy of a copolymer (B-1) and one or more kinds of resins selected from three kinds of resins such as polycarbonate resin (B-2), polyamide resin (B-3) and polyester resin (B-4), a mixed solution of chromic acid and sulfuric acid can be used. In the case in which it contains a polyamide resin (B-3), hydrochloric acid or a stannic chloride solution can be used.

The electroconductive treatment is conducted so as to enable an electroplating treatment by imparting conductivity to the resin molded article. For example, there can be used a method of forming a conductive electroless plating layer on the surface of a resin composition by an electroless plating treatment.

To deposit an electroless plating layer, the surface of the resin molded article must be coated with a metal having a catalytic action, such as palladium, by dipping the resin molded article, whose surface is roughened or not, in a tin-palladium solution or subjecting it to a treatment such as sputtering with palladium metal.

In the case in which the other polymer (B) contains the copolymer (B-1) in the method of dipping in the tin-palladium solution, since the copolymer (B-1) contains a vinyl cyanide monomer unit, tin-palladium can be adsorbed, thereby making it possible to perform electroless plating. Otherwise, a treatment with a surfactant, or a treatment such as kneading with a resin having the other polarity or coating of the surface must be required to adsorb tin-palladium. The treating method is not specifically limited as long as the object of the present invention can be achieved.

Another method of depositing an electroless plating layer includes a method of coating with a solution containing fine metal particles made of nickel and depositing an electroless plating layer in the presence of nickel particles as catalytic nuclei. Examples of the electroless plating include copper, nickel or silver electroless plating.

Examples of the other electroconductive treatment include a method of kneading a resin composition for a platable substrate with carbon black, carbon fibers, metal powders, metal fibers, carbon fibers, or plated fibers or cloth, a method of coating with a conductive coating composition, and a method of sputtering or vacuum evaporation with metal.

The following electroplating treatment can be conducted by a known method. The metal plating layer to be formed is made of copper, nickel, cobalt, chromium, silver, or gold.

The plated parts of the present invention are obtained by subjecting at least a portion of the resin molded article to a plating treatment to form a metal plating layer. The resin molded article may be optionally coated with this metal plating layer. Preferably, the entire surface (including non-effective surface) or 90% or more of the entire surface (including effective surface) of the resin molded article is coated with the metal plating layer in order to sufficiently impart properties of plated parts, for example, excellent EMI shieldability, flexural modulus, rigidity, impact resistance and thermal conductivity.

The thickness of the metal plating layer formed by the plating treatment is preferably 5 µm or more. When the thickness is less than 5 µm, the resulting plated parts are insufficient in rigidity.

In the case in which the metal plating layer is formed on front and back surfaces of the resin molded article, a difference in thickness between the metal plating layer formed on the front surface and the metal plating layer formed on the back surface is preferably 20% or less. When the difference exceeds 20%, tensile stress is produced, when the metal plating layer is deposited on the surface of the resin molded article, differs by the position, i.e., front surface and back surface, thus causing distortion of the resin molded article and accumulation of stress, resulting in defects.

The structure of the metal plating layer is not limited to a single-layer structure, but may be a multi-layer structure composed of two or more layers. In the metal plating layer of the multi-layer structure, the kind of metal and combination of the respective layers are not specifically limited and the thicknesses of the respective layers are not specifically limited if the total thickness of the metal plating layer is 5 µm or more.

The plating layer may be coated before use.

The plated parts of the present invention can be applied to housings for PC (including laptop PC), projectors (including liquid crystal projectors), TVs, printers, facsimile machines, copying machines, audio equipment such as MD players, game machines, cameras (including video cameras and digital cameras), image equipment such as videos, musical instruments, mobile devices (electronic note books, PDAs, etc.), lighting equipment, telephones, and communication equipment (including cell phones); and fishing tackle, toys such as slingshot articles, products for vehicles, products for furniture, sanitary products, and products for building materials, and are preferably applied to housings for laptop PCs and portable devices.

As described above, the resin composition for a platable substrate is excellent in production stability such as moldability, dimensional stability, mechanical strength and plating properties, and is also environmentally friendly. High-performance plated parts having excellent thermal conductivity can be produced by forming a metal plating layer on a resin molded article obtained by molding the resin composition for a platable substrate using a plating treatment.

EXAMPLES

Examples will now be described in detail. The present invention is not limited to the following Examples. In the following Examples, parts and percentages are by weight unless otherwise specified.

Preparation of Graft Copolymer (A-1)

To 100 parts (on solid content basis) of a polybutadiene latex having a solid content of 35% and an average particle diameter of 0.08 µm, 2 parts (on solid content basis) of a copolymer latex comprising 85% of an n-butyl acrylate unit and 15% of a methacrylic acid unit, which has an particle diameter of 0.08 µm, was added with stirring. The mixture was continuously stirred for 30 minutes to obtain an enlarged butadiene rubber polymer latex having an average particle diameter of 0.28 µm.

The resulting enlarged butadiene rubber polymer latex was charged in a reaction vessel and 100 parts of distilled water, 4 parts of Wood Rosin emulsifier, 0.4 parts of Demor N (trade name manufactured by Kao Corporation, formalin naphthalenesulfonate condensate), 0.04 parts of sodium hydroxide and 0.7 parts of dextrose were added. When the inner temperature reached 60° C. after heating with stirring, 0.1 parts of ferrous sulfate, 0.4 parts of sodium pyrophosphate and 0.06 parts of sodium dithionite were added. Furthermore, the following mixture was continuously added dropwise over 90 minutes, allowed to stand for one hour, and then cooled.

| Acrylonitrile | 30 Parts |
| Styrene | 70 Parts |
| Cumen hydroperoxide | 0.4 Parts |
| tert-dodecylmercaptan | 1 Part |

The resulting graft copolymer latex was coagulated with dilute sulfuric acid, washed, filtered, and then dried to obtain a graft copolymer (A-1) as a dry powder.

The content of an acetone soluble matter of the graft copolymer (A-1) was 27% by weight.

Preparation of Graft Copolymer (A-2)

According to the following formulation, raw materials were charged in a reaction vessel and the polymerization was completed while stirring under nitrogen replacement at 50° C. for 4 hours to obtain a rubber latex.

| n-butyl acrylate | 98 Parts |
| 1,3-butylene glycoldimethacrylate | 1 Part |
| Allyl methacrylate | 1 Part |
| Sodium dioctylsulfonate | 2.0 Parts |
| Deionized water | 300 Parts |
| Potassium persulfate | 0.3 Parts |
| Disodium phosphate dodecahydrate | 0.5 Parts |
| Sodium hydrogenphosphate dodecahydrate | 0.3 Parts |

100 Parts (solid content) of the rubber latex was charged in a reaction kettle, diluted with 280 parts of deionized water and then heated to 70° C.

Separately, 0.7 parts of benzoyl peroxide was dissolved in 100 parts of a monomer mixture of acrylonitrile and styrene in a weight ratio of 29:71 and, after the atmosphere was replaced by nitrogen, the monomer mixture was charged in the reaction kettle containing the rubber latex at a rate of 30 parts/hour using a constant rate pump. After the completion of the addition of the entire monomer, the temperature in the system was raised to 80° C. and continuously stirred for 30 minutes to obtain a graft copolymer latex. The polymerization degree was 99%.

The latex thus prepared was added in an aqueous 0.15% solution (90° C.) of aluminum chloride (AlCl$_3$.6H$_2$O) in an amount of three times as much as the entire latex while stirring, thereby to coagulate the latex. After the completion of the addition of the entire latex, the temperature in a coagulation tank was raised to 93° C., followed by standing for 5 minutes. After cooling, the coagulated latex was dehydrated using a centrifugal separator, washed and then dried to obtain a graft copolymer (A-2) as a dry powder.

The content of an acetone soluble matter of the graft copolymer (A-2) was 21% by weight.

Preparation of Graft Copolymer (A-3)

A graft copolymer containing a composite rubber of polybutadiene/polybutyl acrylate as a rubber polymer was synthesized in the following manner.

To 20 parts (on a solid content basis) of a polybutadiene latex having a solid content of 35% and an average particle diameter of 0.08 μm, 0.4 parts (on solid content basis) of a copolymer latex comprising 82% of an n-butyl acrylate unit and 18% of a methacrylic acid unit, which has an average particle diameter of 0.10 μm, was added while stirring. The mixture was continuously stirred for 30 minutes to obtain an enlarged diene rubber latex having an average particle diameter of 0.36 μm.

20 Parts (solid content) of the resulting enlarged diene rubber latex was transferred to a reaction kettle and 1 part of dismutated potassium rosinate, 150 parts of deionized water and the following monomer mixture were added. After the atmosphere was replaced by nitrogen, the temperature was raised to 50° C. (inner temperature). To the mixture, a solution prepared by dissolving 0.0002 parts of ferrous sulfate, 0.0006 parts of disodium ethylenediaminetetraacetate and 0.25 parts of Rongalite in 10 parts of deionized water was added.

| | |
|---|---|
| n-butyl acrylate | 80 Parts |
| Allyl methacrylate | 0.32 Part |
| Ethylene glycol dimethacrylate | 0.16 Parts |

After the completion of the reaction, the inner temperature was 75° C. The temperature was raised to 80° C. and the reaction was continued for one hour. As a result, the polymerization degree reached 98.8% to obtain a composite rubber of an enlarged diene rubber and a polyalkyl acrylate rubber. 50 parts (solid content) of the composite rubber of the enlarged diene rubber and the polyalkyl acrylate rubber was charged in a reaction kettle, diluted with 140 parts of deionized water and then heated to 70° C.

Separately, 50 parts of a graft monomer mixture of acrylonitrile and styrene in a weight of 29:71 was prepared and 0.35 parts of benzoyl peroxide was dissolved, and then the atmosphere was replaced by nitrogen. The monomer mixture was charged in the reaction system at a rate of 15 parts/hour using a constant rate pump. After the completion of the addition of the entire monomer, the temperature in the system was raised to 80° C. and continuously stirred for 30 minutes to obtain a graft copolymer latex. The polymerization degree was 99%.

The latex prepared in the same manner as described above was added in an aqueous 0.5% solution (90° C.) of sulfuric acid in an amount of three times as much as the entire latex while stirring, thereby to coagulate the latex. After the completion of the addition of the entire latex, the temperature in a coagulation tank was raised to 93° C., followed by standing for 5 minutes. After cooling, the coagulated latex was dehydrated using a centrifugal separator, washed and then dried to obtain a graft copolymer (A-3) as a dry powder.

The content of an acetone soluble matter of the graft copolymer (A-3) was 20% by weight.

Preparation of Graft Copolymer (A-4)

A graft copolymer containing a composite rubber of polysiloxane rubber/polybutyl acrylate as a rubber polymer was synthesized in the following manner.

96 Parts of octamethyltetracyclosiloxane, 2 parts of γ-methacryloxypropyldimethoxymethylsilane and 2 parts of ethyl orthosilicate were mixed to obtain 100 parts of a siloxane mixture. To the mixture, a solution prepared by dissolving 0.67 parts of sodium dodecylbenzenesulfonate in 300 parts of distilled water was added. The mixed solution was stirred at 10000 revolutions/2 min using a homomixer and then passed through a homogenizer once under a pressure of 30 MPa to obtain a premixed organosiloxane latex. Separately, 2 parts of dodecylbenzenesulfonic acid and 98 parts of distilled water were charged in a reaction vessel equipped with a reagent injection container, a cooling tube, a jacket heater and a stirrer to prepare an aqueous 2% dodecylbenzenesulfonic acid solution. While heating to 85° C., the aqueous solution was added dropwise in the premixed organosiloxane latex over 4 hours. After the completion of the dropwise addition, the mixture was allowed to stand while being maintained at the same temperature for one hour, and was then cooled. The reaction solution was allowed to stand at room temperature for 48 hours and was then neutralized with an aqueous caustic soda solution. A portion of the latex (L-1) thus obtained was dried at 170° C. for 30 minutes and the solid content was determined. As a result, it was 17.3%.

In a reaction vessel equipped with a reagent injection container, a cooling tube, a jacket heater and a stirrer, 119.5 parts of a polyorganosiloxane latex (L-1) and 0.8 parts of sodium polyoxyethylene alkylphenyl ether sulfate were charged and then mixed with 203 parts of distilled water. Furthermore, a mixture comprising 53.2 parts of n-butyl acrylate, 0.21 parts of allyl methacrylate, 0.11 parts of 1,3-butylene glycol dimethacrylate and 0.13 parts of tertiary butyl hydroperoxide was added. The atmosphere was replaced by nitrogen by passing a nitrogen gas through the reaction vessel and the temperature was raised to 60° C. After the temperature in the reaction vessel reached 60° C., an aqueous solution prepared by dissolving 0.0001 parts of ferrous sulfate, 0.0003 parts of disodium ethylenediamine tetraacetate and 0.24 parts of Rongalite in 10 parts of distilled water was added and the radical polymerization was initiated. The solution temperature increased to 78° C. by the polymerization of the acrylate component. This state was maintained for one hour, thereby to complete the polymerization of the acrylate component to obtain a composite rubber latex of polyorganosiloxane and a butyl acrylate rubber.

After the solution temperature in the reaction vessel decreased to 60° C., an aqueous solution prepared by dissolving 0.4 parts of Rongalite in 10 parts of distilled water was added. Then, a mixed solution of 11.1 parts of acrylonitrile, 33.2 parts of styrene and 0.2 parts of tertiary butyl hydroperoxide was added dropwise over about one hour and the polymerization was conducted. After the completion of the dropwise addition and standing for one hour, an aqueous solution prepared by dissolving 0.0002 parts of ferrous sulfate, 0.0006 parts of disodium ethylenediamine tetraacetate and 0.25 parts of Rongalite in 10 parts of distilled water was added. Then, a mixed solution of 7.4 parts of acrylonitrile, 22.2 parts of styrene and 0.1 parts of tertiary butyl hydroperoxide was added dropwise over about 40 minutes. After the completion of the dropwise addition and standing for one hour, the mixture was cooled to obtain a latex of a graft copolymer prepared by grafting the composite rubber of polyorganosiloxane and the butyl acrylate rubber with an acrylonitrile-styrene copolymer.

Then, 150 parts of an aqueous solution prepared by dissolving 5% of calcium acetate was heated to 60° C. and stirred. In the aqueous solution, 100 parts of the latex of the graft copolymer was gradually added dropwise, thereby to coagulate the latex. The deposit was separated, washed and then dried to obtain a graft copolymer (A-4) as a dry powder.

The content of an acetone soluble matter of the graft copolymer (A-4) was 26% by weight.

Preparation of Copolymer (B-1a)

A copolymer containing 30% of an acrylonitrile unit and 70% of a styrene unit was prepared by a suspension polymerization method.

Polycarbonate Resin (B-2a)

As the polycarbonate resin (B-2a), "7022A" manufactured by Mitsubishi Engineering-Plastics Corporation was used.

Polyamide Resin (B-3a)

As the polyamide resin (B-3a), "1011FB" manufactured by UBE INDUSTRIES, LTD. was used.

Polybutyl Terephthalate Resin (B-4a)

As the polybutyl terephthalate resin (B-4a), "TAFPET PBT N1000" manufactured by Mitsubishi Rayon Co., Ltd. was used.

Examples 1 to 29 and 36 to 38 and Comparative Examples 1 to 11 and 21 to 26

According to the formulations shown in Tables 1 to 3, a graft copolymer (A), the other polymer (B), a red phosphorus flame retardant (D) and an inorganic filler (E) were respectively mixed to prepare resin compositions for a platable substrate. Each respective graft copolymer (A) contains an acetone soluble matter and the acetone soluble matter is counted as the other polymer (B). Therefore, in the tables, the actual amount and the net amount excluding the amount of the acetone soluble matter are described in the column of the graft copolymer (A), and also an amount of the acetone soluble matter, counted as the other polymer (B), in the graft copolymer (A) was described. As the phosphate ester flame retardant (D), "ADEKASTAB FP-500" (molecular weight: 686, described as D-1 in the table) and "ADEKASTAB FP-700" (molecular weight: 692, described as D-2 in the table) manufactured by Asahi Denka Co., Ltd.; "CR-733S" (molecular weight: 574, described as D-3 in the table) and "PX-200" (molecular weight: 686, described as D-4 in the table) manufactured by DAIHACHI CHEMICAL INDUSTRY CO., LTD.; and "Kronitex TCP" (molecular weight: 368, described as D-5 in the table), "Kronitex TXP" (molecular weight: 410, described as D-6 in the table) and "REOFOS BAPP" (molecular weight: 692, described as D-7 in the table) manufactured by Ajinomoto-Fine-Techno Co., Inc., were used. In Comparative Examples 1 to 3, as the flame retardant, triphenylene phosphate having a molecular weight of 326 (described as F-1 in the table) was used.

Regarding the inorganic filler (E), "ECS03-T191" (described as GF in the table) manufactured by Nippon Electric Glass Co., Ltd., was used as the glass fiber and "TR06U" (described as CF in the table) manufactured by Mitsubishi Rayon Co., Ltd., was used as the carbon fibers.

Flame retardancy, moldability and plating properties of the resulting respective resin compositions for plating substrate were evaluated by the procedures described hereinabove. After the respective resin compositions for plating substrate were molded, a metal plating layer was formed according to the following plating process and various physical properties were evaluated.

These results are shown in Tables 4 to 9.

Flame Retardancy

Test pieces (12.7 mm×127 mm×1.0 mm [thickness]) were made and a combustion test was carried out in accordance with UL94.

In the tables, abbreviations are as follows.

◎: V-0 grade

○: V-2 grade

X: V-2 grade or lower

The combustion test was performed by the following procedure in accordance with UL94.

The lower end of the vertically held test piece was caused to contact the flame of a burner for 10 seconds, and the combustion of the test piece was stopped immediately after the flame ceased to be applied to the test piece. The flame of a burner is applied again to the test pieces and the same operation was conducted. The flame retardancy is evaluated by the total of a flame maintenance time after the completion of the first flame contact, a flame maintenance time after the completion of the second flame contact and a non-flame maintenance time as well as the presence or absence of dripping. Furthermore, with regard to UL-94, the respective V grade criteria may be summarized as shown below.

V-0: The first flame maintenance time was less than 10 seconds and the total of the second flame maintenance time and non-flame maintenance time was less than 30 seconds. Furthermore, none of the test pieces exhibited any dripping.

V-1: The first flame maintenance time was more than 10 seconds and 30 seconds or less and the total of the second flame maintenance time and non-flame maintenance time was more than 30 seconds and 60 seconds or less. Furthermore, none of the test pieces exhibited any dripping.

V-2: The first flame maintenance time was more than 10 seconds and 30 seconds or less and the total of the second flame maintenance time and non-flame maintenance time was more than 30 seconds and 60 seconds or less. Furthermore, the test pieces exhibited dripping.

Moldability (1) Occurrence of Burrs

Box-shaped molded articles (297 mm×185 mm×20 mm [1.25 mm in thickness]) were formed and the presence or absence of burrs was observed.

In the tables, abbreviations are as follows.

○: none

X: burrs (2) Occurrence of Warp

Box-shaped molded articles (297 mm×185 mm×20 mm [1.25 mm in thickness]) were formed and the presence or absence of warp of 2 mm or more was observed.

In the tables, abbreviations are as follows.

○: none

X: warp (3) Gas Deposition

Box-shaped molded articles (297 mm×185 mm×20 mm [1.25 mm in thickness]) were continuously formed (100 shots) and the presence or absence of gas deposition on the mold surface was confirmed.

In the tables, abbreviations are as follows.

⊚: no gas deposit
○: gas blooming (slight gas deposit) after 100 shots
Δ: gas blooming (slight gas deposit) after 80 shots
X: gas deposit after 50 shots Plating Properties By the following plating process, box-shaped molded articles (297 mm×185 mm×20 mm [1.25 mm in thickness]) were subjected to a plating treatment and the presence or absence of poor plating was observed.

In the tables, abbreviations are as follows.

⊚: no poor plating
○: slightly poor plating (0 to 1%)
Δ: slightly poor plating (1 to 5%)
X: poor plating (5% or more)

Flexural Modulus

The flexural modulus as an index of rigidity modulus was measured. By the following plating process, test pieces (10 mm×100 mm×4 mm [in thickness]) were subjected to a plating treatment and the flexural modulus was measured in accordance with ASTM D-790.

Izod Impact Strength

By the following plating process, test pieces (12.7 mm×63.5 mm×3.2 mm [in thickness]) were subjected to a plating treatment and the flexural modulus was measured in accordance with ASTM D-256. It was rated that test pieces with a value of 200 J/m as measured by this test method were suitable for practical use.

Thermal Cycle Properties

By the following plating process, plates (100 mm×100 mm×3 mm [in thickness]) were subjected to a plating treatment. Then, these plates were test under the following thermal cycle conditions and the presence or absence of blistering of the plating layer was confirmed.

Thermal Cycle Conditions

Three cycles, each cycle comprising heating at −30° C. for one hour, heating at 23° C. for 15 min, heating at 80° C. for one hour and heating at 23° C. for one hour, were carried out.

In the tables, abbreviations are as follows.

○: no change
X: blistering occurred in the vicinity of gates
XX: blistering also occurred at other portions
XXX: blistering occurred over plating layer Thermal Conductivity By the following plating process, plates (100 mm×100 mm×3 mm [in thickness]) were subjected to a plating treatment and the thermal conductivity was measured by using a Shotherm QTM (quick thermal conductivity meter manufactured by Showa Denko K. K.).

Plating Process (1) degreasing (at 60° C. for 3 min)→(2) washing→(3) etching (400 g/l of $CrO_3$, 200 cc/l of $H_2SO_4$, at 60° C. for 8 min)→(4) washing→(5) acid treatment (at normal temperature for 1 min)→(6) washing→(7) catalyzing treatment (at 25° C. for 3 min)→(8) washing→(9) activation treatment (at 40° C. for 5 min)→(10) washing→(11) chemical nickel plating→(12) washing→(13) copper electroplating (plating layer having a thickness of 15 μm, at 20° C. for 20 min)→(14) washing→(15) nickel electroplating (plating layer having a thickness of 10 μm, at 55° C. for 15 min)→(16) washing →(17) drying In Examples 19 and 20, an electroplating treatment was carried out in the same manner, except that the processes (13) and (14) were eliminated and the time of the process (15) was changed to 6 min, a plating layer having a thickness of 4 μm was formed.

As is apparent from Tables 4 to 6, all resin compositions for a platable substrate of the Examples were excellent in flame retardancy, moldability and plating properties, and plated plates produced by forming a metal plating layer on a resin molded article obtained by molding the resin composition for a platable substrate was excellent in flexural modulus, impact strength and thermal conductivity and also excellent in thermal cycle properties (plating properties).

TABLE 1

| | Graft polymer (A) | | | | | Rubber polymer | |
|---|---|---|---|---|---|---|---|
| | Actual amount | | | | Net amount excluding amount of acetone | Content | Average particle |
| Examples | A-1 | A-2 | A-3 | A-4 | soluble matter | (% by weight) | diameter (μm) |
| 1 | 40 | | | | 29.2 | 20 | 0.28 |
| 2 | | 40 | | | 31.6 | 20 | 0.25 |
| 3 | | | 40 | | 32 | 20 | 0.36 |
| 4 | | | | 40 | 29.6 | 20 | 0.14 |
| 5 | | | 40 | | 32 | 20 | 0.36 |
| 6 | | | 40 | | 32 | 20 | 0.36 |
| 7 | 20 | | | | 14.6 | 10 | 0.28 |
| 8 | | 20 | | | 15.8 | 10 | 0.25 |
| 9 | | | 20 | | 16 | 10 | 0.36 |
| 10 | | | | 20 | 14.8 | 10 | 0.14 |
| 11 | | | 20 | | 16 | 10 | 0.36 |
| 12 | | | 20 | | 16 | 10 | 0.36 |

TABLE 1-continued

| | | | | | |
|---|---|---|---|---|---|
| 13 | 20 | | 16 | 10 | 0.36 |
| 14 | 20 | | 16 | 10 | 0.36 |
| 15 | 25 | | 20 | 12.5 | 0.36 |
| 16 | 25 | | 20 | 12.5 | 0.36 |
| 17 | 15 | | 12 | 7.5 | 0.36 |
| 18 | | 15 | 11.1 | 7.5 | 0.14 |
| 19 | 40 | | 32 | 20 | 0.36 |
| 20 | 20 | | 16 | 10 | 0.36 |

| | Other polymer (B) | | | | | Flame retardant (D) | Inorganic filler (E) | |
|---|---|---|---|---|---|---|---|---|
| Examples | Acetone soluble matter in (A) | B-1a | B-2a | B-3a | B-4a | D-1 | GF | CF |
| 1 | 10.8 | 60 | | | | 30 | | |
| 2 | 8.4 | 60 | | | | 30 | | |
| 3 | 8 | 60 | | | | 30 | | |
| 4 | 10.4 | 60 | | | | 30 | | |
| 5 | 8 | 60 | | | | 30 | 25 | |
| 6 | 8 | 60 | | | | 30 | | 10 |
| 7 | 5.4 | 10 | 70 | | | 20 | | |
| 8 | 4.2 | 10 | 70 | | | 20 | | |
| 9 | 4 | 10 | 70 | | | 20 | | |
| 10 | 5.2 | 10 | 70 | | | 20 | | |
| 11 | 4 | 10 | 70 | | | 20 | 25 | |
| 12 | 4 | 10 | 70 | | | 20 | | 10 |
| 13 | 4 | 10 | 70 | | | 20 | | 20 |
| 14 | 4 | 10 | 70 | | | 20 | | 30 |
| 15 | 5 | 25 | | 50 | | 30 | | 10 |
| 16 | 5 | 25 | | | 50 | 30 | | 10 |
| 17 | 3 | | 70 | 15 | | 20 | | 10 |
| 18 | 3.9 | 10 | 70 | | 5 | 20 | | 10 |
| 19 | 8 | 60 | | | | 30 | | 10 |
| 20 | 4 | 10 | 70 | | | 20 | | 10 |

TABLE 2

| | Graft polymerization (A) | | Rubber polymer | |
|---|---|---|---|---|
| Examples | Actual amount A-3 | Net amount excluding amount of acetone soluble matter | Content (% by weight) | Average particle diameter (μm) |
| 21 | 20 | 16 | 10 | 0.36 |
| 22 | 20 | 16 | 10 | 0.36 |
| 23 | 20 | 16 | 10 | 0.36 |
| 24 | 20 | 16 | 10 | 0.36 |
| 25 | 20 | 16 | 10 | 0.36 |
| 26 | 20 | 16 | 10 | 0.36 |
| 27 | 20 | 16 | 10 | 0.36 |
| 28 | 20 | 16 | 10 | 0.36 |
| 29 | 20 | 16 | 10 | 0.36 |
| Comp. Ex. 21 | 20 | 16 | 10 | 0.36 |
| Comp. Ex. 22 | 20 | 16 | 10 | 0.36 |
| Comp. Ex. 23 | 20 | 16 | 10 | 0.36 |
| Comp. Ex. 24 | 20 | 16 | 10 | 0.36 |
| Comp. Ex. 25 | 20 | 16 | 10 | 0.36 |
| Comp. Ex. 26 | 20 | 16 | 10 | 0.36 |
| 36 | 20 | 16 | 10 | 0.36 |
| 37 | 20 | 16 | 10 | 0.36 |
| 38 | 20 | 16 | 10 | 0.36 |

| | Other polymer (B) | | Flame retardant (D) | | | | | | Inorganic filler (E) | |
|---|---|---|---|---|---|---|---|---|---|---|
| Examples | Acetone soluble matter in (A) | B-1a | B-2a | D-2 | D-3 | D-4 | D-5 | D-6 | D-7 | GF | CF |
| 21 | 4 | 10 | 70 | 20 | | | | | | | |
| 22 | 4 | 10 | 70 | 20 | | | | | | 25 | |

TABLE 2-continued

| | | | | | | | | | |
|---|---|---|---|---|---|---|---|---|---|
| 23 | 4 | 10 | 70 | 20 | | | | | 10 |
| 24 | 4 | 10 | 70 | | 20 | | | | |
| 25 | 4 | 10 | 70 | | 20 | | | 25 | |
| 26 | 4 | 10 | 70 | | 20 | | | | 10 |
| 27 | 4 | 10 | 70 | | | 20 | | | |
| 28 | 4 | 10 | 70 | | | 20 | | 25 | |
| 29 | 4 | 10 | 70 | | | 20 | | | 10 |
| Comp. Ex. 21 | 4 | 10 | 70 | | | | 20 | | |
| Comp. Ex. 22 | 4 | 10 | 70 | | | | 20 | 25 | |
| Comp. Ex. 23 | 4 | 10 | 70 | | | | 20 | | 10 |
| Comp. Ex. 24 | 4 | 10 | 70 | | | | | 20 | |
| Comp. Ex. 25 | 4 | 10 | 70 | | | | | 20 | 25 |
| Comp. Ex. 26 | 4 | 10 | 70 | | | | | 20 | 10 |
| 36 | 4 | 10 | 70 | | | | | 20 | |
| 37 | 4 | 10 | 70 | | | | | 20 | 25 |
| 38 | 4 | 10 | 70 | | | | | 20 | 10 |

TABLE 3

| Comparative Examples | Graft polymer (A) | | Net amount excluding amount of acetone soluble matter | Rubber polymer | | Other polymer (B) | | | Flame retardant | | Inorganic filler (E) | |
|---|---|---|---|---|---|---|---|---|---|---|---|---|
| | A-2 | A-3 | | Content (% by weight) | Average particle diameter (μm) | Acetone soluble matter in (A) | B-1a | B-2a | D-1 | F-1 | GF | CF |
| 1 | 20 | | 15.8 | 10 | 0.25 | 4.2 | 5 | 75 | 15 | | | |
| 2 | 20 | | 15.8 | 10 | 0.25 | 4.2 | 5 | 75 | 15 | | 25 | |
| 3 | 20 | | 15.8 | 10 | 0.25 | 4.2 | 5 | 75 | 15 | | | 10 |
| 4 | | 8 | 6.4 | 4 | 0.36 | 1.6 | 92 | | 30 | | | |
| 5 | | 80 | 64 | 40 | 0.36 | 16 | 35 | | 30 | | | |
| 6 | | 8 | 6.4 | 4 | 0.36 | 1.6 | 22 | 70 | 20 | | | |
| 7 | | 80 | 64 | 40 | 0.36 | 16 | | 35 | 20 | | | |
| 8 | | 40 | 32 | 20 | 0.36 | 8 | 60 | | 4 | | | |
| 9 | | 25 | 20 | 12.5 | 0.36 | 5 | 10 | 70 | 4 | | | |
| 10 | | 40 | 32 | 20 | 0.36 | 8 | 60 | | 50 | | | |
| 11 | | 25 | 20 | 12.5 | 0.36 | 5 | 10 | 70 | 50 | | | |

TABLE 4

| Examples | Flame retardancy | Moldability | | | | Various properties | | | |
|---|---|---|---|---|---|---|---|---|---|
| | | Occurrence of burrs | Occurrence of warp | Gas deposition | Plating properties | Flexural modulus (MPa) | Izod impact strength (J/m) | Thermal cycle properties | Thermal conductivity (W/m · °C.) |
| 1 | ○ | ○ | ○ | ◎ | ◎ | 6800 | not fractured | ○ | 0.60 |
| 2 | ○ | ○ | ○ | ◎ | ◎ | 6800 | not fractured | ○ | 0.60 |
| 3 | ○ | ○ | ○ | ◎ | ◎ | 6800 | not fractured | ○ | 0.60 |
| 4 | ○ | ○ | ○ | ◎ | ◎ | 6800 | not fractured | ○ | 0.60 |
| 5 | ○ | ○ | ○ | ◎ | ◎ | 13500 | 410 | ○ | 0.80 |
| 6 | ○ | ○ | ○ | ◎ | ◎ | 14000 | 400 | ○ | 0.84 |
| 7 | ◎ | ○ | ○ | ◎ | ◎ | 7000 | not fractured | ○ | 0.60 |
| 8 | ◎ | ○ | ○ | ◎ | ◎ | 7000 | not fractured | ○ | 0.60 |

TABLE 4-continued

| | | Moldability | | | | Various properties | | | |
| | | | | | | Flexural | Izod impact | Thermal | Thermal |
| Examples | Flame retardancy | Occurrence of burrs | Occurrence of warp | Gas deposition | Plating properties | modulus (MPa) | strength (J/m) | cycle properties | conductivity (W/m · ° C.) |
|---|---|---|---|---|---|---|---|---|---|
| 9 | ◉ | ○ | ○ | ◉ | ◉ | 7000 | not fractured | ○ | 0.60 |
| 10 | ◉ | ○ | ○ | ◉ | ◉ | 7000 | not fractured | ○ | 0.61 |
| 11 | ◉ | ○ | ○ | ◉ | ◉ | 14000 | 550 | ○ | 0.81 |
| 12 | ◉ | ○ | ○ | ◉ | ◉ | 15000 | 440 | ○ | 0.85 |
| 13 | ◉ | ○ | ○ | ◉ | ◉ | 21000 | 490 | ○ | 0.90 |
| 14 | ◉ | ○ | ○ | ◉ | ◉ | 25000 | 460 | ○ | 0.92 |
| 15 | ○ | ○ | ○ | ◉ | ◉ | 15000 | 580 | ○ | 0.84 |
| 16 | ○ | ○ | ○ | ◉ | ◉ | 14000 | 430 | ○ | 0.85 |
| 17 | ◉ | ○ | ○ | ◉ | ◉ | 14000 | 560 | ○ | 0.82 |
| 18 | ◉ | ○ | ○ | ◉ | ◉ | 15000 | 440 | ○ | 0.85 |
| 19 | ○ | ○ | ○ | ◉ | ◉ | 7200 | 240 | ○ | 0.70 |
| 20 | ◉ | ○ | ○ | ◉ | ◉ | 8000 | 240 | ○ | 0.72 |

TABLE 5

| | | Moldability | | | | Various properties | | | |
| | | | | | | Flexural | Izod impact | Thermal | Thermal |
| Examples | Flame retardancy | Occurrence of burrs | Occurrence of warp | Gas deposition | Plating properties | modulus (MPa) | strength (J/m) | cycle properties | conductivity (W/m · ° C.) |
|---|---|---|---|---|---|---|---|---|---|
| 21 | ◉ | ○ | ○ | ◉ | ◉ | 7000 | not fractured | ○ | 0.60 |
| 22 | ◉ | ○ | ○ | ◉ | ◉ | 14000 | 550 | ○ | 0.81 |
| 23 | ◉ | ○ | ○ | ◉ | ◉ | 15000 | 440 | ○ | 0.85 |
| 24 | ◉ | ○ | ○ | ○ | ◉ | 7000 | not fractured | ○ | 0.60 |
| 25 | ◉ | ○ | ○ | ○ | ◉ | 14000 | 540 | ○ | 0.81 |
| 26 | ◉ | ○ | ○ | ○ | ◉ | 15000 | 430 | ○ | 0.85 |
| 27 | ◉ | ○ | ○ | ◉ | ◉ | 7000 | not fractured | ○ | 0.60 |
| 28 | ◉ | ○ | ○ | ◉ | ◉ | 14000 | 550 | ○ | 0.81 |
| 29 | ◉ | ○ | ○ | ◉ | ◉ | 15000 | 440 | ○ | 0.85 |
| Comp. Ex. 21 | ◉ | ○ | ○ | Δ | Δ | 7000 | not fractured | ○ | 0.60 |
| Comp. Ex. 22 | ◉ | ○ | ○ | Δ | Δ | 14000 | 550 | ○ | 0.81 |
| Comp. Ex. 23 | ◉ | ○ | ○ | Δ | Δ | 15000 | 440 | ○ | 0.85 |
| Comp. Ex. 24 | ◉ | ○ | ○ | ○ | ○ | 7000 | not fractured | ○ | 0.60 |
| Comp. Ex. 25 | ◉ | ○ | ○ | ○ | ○ | 14000 | 550 | ○ | 0.81 |
| Comp. Ex. 26 | ◉ | ○ | ○ | ○ | ○ | 15000 | 440 | ○ | 0.85 |
| 36 | ◉ | ○ | ○ | ◉ | ◉ | 7000 | not fractured | ○ | 0.60 |
| 37 | ◉ | ○ | ○ | ◉ | ◉ | 14000 | 540 | ○ | 0.81 |
| 38 | ◉ | ○ | ○ | ◉ | ◉ | 15000 | 430 | ○ | 0.85 |

TABLE 6

| | | Moldability | | | | Various properties | | | |
| | | | | | | Flexural | Izod impact | Thermal | Thermal |
| Comparative Examples | Flame retardancy | Occurrence of burrs | Occurrence of warp | Gas deposition | Plating properties | modulus (MPa) | strength (J/m) | cycle properties | conductivity (W/m · ° C.) |
|---|---|---|---|---|---|---|---|---|---|
| 1 | ◉ | ○ | ○ | X | X | 7000 | not fractured | ○ | 0.60 |
| 2 | ◉ | ○ | ○ | X | X | 13300 | 430 | ○ | 0.81 |
| 3 | ◉ | ○ | ○ | X | X | 13500 | 320 | ○ | 0.86 |
| 4 | ○ | ○ | ○ | ◉ | ◉ | 7000 | 330 | XX | 0.60 |

TABLE 6-continued

| Comparative Examples | Flame retardancy | Moldability | | | Plating properties | Various properties | | | |
|---|---|---|---|---|---|---|---|---|---|
| | | Occurrence of burrs | Occurrence of warp | Gas deposition | | Flexural modulus (MPa) | Izod impact strength (J/m) | Thermal cycle properties | Thermal conductivity (W/m · °C.) |
| 5 | X | ○ | ○ | ◎ | ◎ | 6500 | not fractured | XX | 0.60 |
| 6 | ◎ | ○ | ○ | ◎ | ◎ | 7200 | 360 | XX | 0.60 |
| 7 | X | ○ | ○ | ◎ | ◎ | 6700 | not fractured | XX | 0.60 |
| 8 | X | ○ | ○ | ◎ | ◎ | 7000 | not fractured | ○ | 0.60 |
| 9 | X | ○ | ○ | ◎ | ◎ | 7200 | not fractured | ○ | 0.60 |
| 10 | ○ | ○ | ○ | ◎ | ◎ | 6300 | 100 | ○ | 0.60 |
| 11 | ◎ | ○ | ○ | ◎ | ◎ | 6500 | 120 | ○ | 0.60 |

Reference Examples 1 to 20 and Comparative Examples 12 to 20

According to the formulations shown in Tables 7 and 8, a graft copolymer (A), the other polymer (B), a red phosphorus flame retardant (D') and an inorganic filler (E) were respectively mixed to prepare resin compositions for a platable substrate. Each respective graft copolymer (A) contains an acetone soluble matter and the acetone soluble matter is counted as the other polymer (B). Therefore, in the tables, an actual amount and a net amount excluding the amount of the acetone soluble matter are described in the column of the graft copolymer (A), and also an amount of the acetone soluble matter, counted as the other polymer (B), in the graft copolymer (A) was described. As the red phosphorus flame retardant (D'), "Nova Excel 140" manufactured by RINKAGAKU KOUGYO CO., LTD. was used.

As the inorganic filler (E), the same fibers as those in Examples 1 to 29 and 36 to 38, and Comparative Examples 21 to 26 were used.

In the same manner as in Examples 1 to 29 and 36 to 38, and Comparative Examples 21 to 26, flame retardancy, moldability and plating properties of the resulting respective resin compositions for plating substrate were evaluated by the procedures described hereinabove.

These results are shown in Tables 9 and 10.

As is apparent from the results shown in Tables 9 and 10, all resin compositions for a platable substrate of these examples were excellent in flame retardancy, moldability and plating properties, and also plated parts comprising a resin molded article obtained by molding and a metal plating layer provided on the resin molded article was excellent in flexural modulus, impact strength, thermal conductivity and thermal cycle properties (plating properties).

TABLE 7

| | Graft polymer (A) | | | | | Rubber polymer | |
|---|---|---|---|---|---|---|---|
| | Actual amount | | | | Net amount excluding amount of acetone | Content | Average particle |
| Examples | A-1 | A-2 | A-3 | A-4 | soluble matter | (% by weight) | diameter (μm) |
| 1 | 40 | | | | 29.2 | 20 | 0.28 |
| 2 | | 40 | | | 31.6 | 20 | 0.25 |
| 3 | | | 40 | | 32.0 | 20 | 0.36 |
| 4 | | | | 40 | 29.6 | 20 | 0.14 |
| 5 | | | 40 | | 32.0 | 20 | 0.36 |
| 6 | | | 40 | | 32.0 | 20 | 0.36 |
| 7 | 25 | | | | 18.3 | 12.5 | 0.28 |
| 8 | | 25 | | | 19.8 | 12.5 | 0.25 |
| 9 | | | 25 | | 20.0 | 12.5 | 0.36 |
| 10 | | | | 25 | 18.5 | 12.5 | 0.14 |
| 11 | | | 25 | | 20.0 | 12.5 | 0.36 |
| 12 | | | 25 | | 20.0 | 12.5 | 0.36 |
| 13 | | | 25 | | 20.0 | 12.5 | 0.36 |
| 14 | | | 25 | | 20.0 | 12.5 | 0.36 |
| 15 | | | 25 | | 20.0 | 12.5 | 0.36 |
| 16 | | | 25 | | 20.0 | 12.5 | 0.36 |
| 17 | | | 25 | | 20.0 | 12.5 | 0.36 |
| 18 | | | | 20 | 14.8 | 10 | 0.14 |
| 19 | | | 40 | | 32.0 | 20 | 0.36 |
| 20 | | | 25 | | 20.0 | 12.5 | 0.36 |

TABLE 7-continued

| | | Other polymer (B) | | | | Flame retardant | Inorganic filler (E) | |
|---|---|---|---|---|---|---|---|---|
| | Acetone soluble | | | | | | | |
| Examples | matter in (A) | B-1a | B-2a | B-3a | B-4a | (D') | GF | CF |
| 1 | 10.8 | 60 | | | | 30 | | |
| 2 | 8.4 | 60 | | | | 30 | | |
| 3 | 8.0 | 60 | | | | 30 | | |
| 4 | 10.4 | 60 | | | | 30 | | |
| 5 | 8.0 | 60 | | | | 30 | 25 | |
| 6 | 8.0 | 60 | | | | 30 | | 10 |
| 7 | 6.7 | 25 | 50 | | | 3 | | |
| 8 | 5.2 | 25 | 50 | | | 3 | | |
| 9 | 5.0 | 25 | 50 | | | 3 | | |
| 10 | 6.5 | 25 | 50 | | | 3 | | |
| 11 | 5.0 | 25 | 50 | | | 3 | 25 | |
| 12 | 5.0 | 25 | 50 | | | 3 | | 10 |
| 13 | 5.0 | 25 | 50 | | | 3 | | 20 |
| 14 | 5.0 | 25 | 50 | | | 3 | | 30 |
| 15 | 5.0 | 25 | | 50 | | 30 | | 10 |
| 16 | 5.0 | 25 | | | 50 | 30 | | 10 |
| 17 | 5.0 | | 50 | | 25 | 3 | | 10 |
| 18 | 5.2 | 20 | 50 | | 10 | 3 | | 10 |
| 19 | 8.0 | 60 | | | | 30 | | 10 |
| 20 | 5.0 | 25 | 50 | | | 3 | | 10 |

TABLE 8

| | Graft polymer (A) | | Rubber polymer | |
|---|---|---|---|---|
| Comparative Examples | Actual amount A-3 | Net amount excluding amount of acetone soluble matter | Content (% by weight) | Average particle diameter (µm) |
| 12 | | | 0 | |
| 13 | 8 | 6.4 | 4 | 0.36 |
| 14 | 65 | 64.0 | 32.5 | 0.36 |
| 15 | 8 | 6.4 | 4 | 0.36 |
| 16 | 65 | 64.0 | 32.5 | 0.36 |
| 17 | 40 | 32.0 | 20 | 0.36 |
| 18 | 25 | 20.0 | 12.5 | 0.36 |
| 19 | 40 | 32.0 | 20 | 0.36 |
| 20 | 25 | 20.0 | 12.5 | 0.36 |

| | | Other polymer (B) | | | Flame retardant | Inorganic filler (E) |
|---|---|---|---|---|---|---|
| Comparative Examples | Acetone soluble matter in (A) | B-1a | B-2a | B-3a | (D') | CF |
| 12 | | | | 100 | 30 | 20 |
| 13 | 1.6 | 92 | | | 30 | |
| 14 | 16.0 | 35 | | | 30 | |
| 15 | 1.6 | 42 | 50 | | 3 | |
| 16 | 16.0 | | 35 | | 3 | |
| 17 | 8.0 | 60 | | | 1 | |
| 18 | 5.0 | 25 | 50 | | 1 | |
| 19 | 8.0 | 60 | | | 50 | |
| 20 | 5.0 | 25 | 50 | | 50 | |

TABLE 9

| | | | | | | Various properties | | | |
|---|---|---|---|---|---|---|---|---|---|
| | | Moldability | | | | Flexural | Izod impact | Thermal | Thermal |
| Examples | Flame retardancy | Occurrence of burrs | Occurrence of warp | Gas deposition | Plating properties | modulus (MPa) | strength (J/m) | cycle properties | conductivity (W/m · °C.) |
| 1 | ⊚ | ○ | ○ | ⊚ | ⊚ | 7000 | not fractured | ○ | 0.60 |
| 2 | ⊚ | ○ | ○ | ⊚ | ⊚ | 7000 | not fractured | ○ | 0.60 |
| 3 | ⊚ | ○ | ○ | ⊚ | ⊚ | 7000 | not fractured | ○ | 0.60 |

TABLE 9-continued

| | | Moldability | | | | Various properties | | | |
| | | | | | | Flexural | Izod impact | Thermal | Thermal |
| Examples | Flame retardancy | Occurrence of burrs | Occurrence of warp | Gas deposition | Plating properties | modulus (MPa) | strength (J/m) | cycle properties | conductivity (W/m · ° C.) |
|---|---|---|---|---|---|---|---|---|---|
| 4 | ⊚ | ○ | ○ | ⊚ | ⊚ | 7000 | not fractured | ○ | 0.60 |
| 5 | ⊚ | ○ | ○ | ⊚ | ⊚ | 13500 | 410 | ○ | 0.80 |
| 6 | ⊚ | ○ | ○ | ⊚ | ⊚ | 14000 | 400 | ○ | 0.84 |
| 7 | ⊚ | ○ | ○ | ⊚ | ⊚ | 7000 | not fractured | ○ | 0.60 |
| 8 | ⊚ | ○ | ○ | ⊚ | ⊚ | 7000 | not fractured | ○ | 0.60 |
| 9 | ⊚ | ○ | ○ | ⊚ | ⊚ | 7000 | not fractured | ○ | 0.60 |
| 10 | ⊚ | ○ | ○ | ⊚ | ⊚ | 7000 | not fractured | ○ | 0.61 |
| 11 | ⊚ | ○ | ○ | ⊚ | ⊚ | 14000 | 550 | ○ | 0.81 |
| 12 | ⊚ | ○ | ○ | ⊚ | ⊚ | 15000 | 440 | ○ | 0.85 |
| 13 | ⊚ | ○ | ○ | ⊚ | ⊚ | 21000 | 490 | ○ | 0.90 |
| 14 | ⊚ | ○ | ○ | ⊚ | ⊚ | 25000 | 460 | ○ | 0.92 |
| 15 | ⊚ | ○ | ○ | ⊚ | ⊚ | 15000 | 580 | ○ | 0.84 |
| 16 | ⊚ | ○ | ○ | ⊚ | ⊚ | 14000 | 430 | ○ | 0.85 |
| 17 | ⊚ | ○ | ○ | ⊚ | ⊚ | 14000 | 560 | ○ | 0.82 |
| 18 | ⊚ | ○ | ○ | ⊚ | ⊚ | 15000 | 440 | ○ | 0.85 |
| 19 | ⊚ | ○ | ○ | ⊚ | ⊚ | 7200 | 240 | ○ | 0.70 |
| 20 | ⊚ | ○ | ○ | ⊚ | ⊚ | 8000 | 240 | ○ | 0.72 |

TABLE 10

| | | Moldability | | | | Various properties | | | |
| | | | | | | Flexural | Izod impact | Thermal | Thermal |
| Comparative Examples | Flame retardancy | Occurrence of burrs | Occurrence of warp | Gas deposition | Plating properties | modulus (MPa) | strength (J/m) | cycle properties | conductivity (W/m · ° C.) |
|---|---|---|---|---|---|---|---|---|---|
| 12 | ⊚ | X | X | ⊚ | ⊚ | 23000 | 650 | XX | 0.80 |
| 13 | ⊚ | ○ | ○ | ⊚ | ⊚ | 7000 | 330 | XX | 0.60 |
| 14 | X | ○ | ○ | ⊚ | ⊚ | 7000 | not fractured | XX | 0.60 |
| 15 | ⊚ | ○ | ○ | ⊚ | ⊚ | 7000 | 360 | XX | 0.60 |
| 16 | X | ○ | ○ | ⊚ | ⊚ | 7000 | not fractured | XX | 0.60 |
| 17 | X | ○ | ○ | ⊚ | ⊚ | 7000 | not fractured | ○ | 0.60 |
| 18 | X | ○ | ○ | ⊚ | ⊚ | 7000 | not fractured | ○ | 0.60 |
| 19 | ⊚ | ○ | ○ | ⊚ | ⊚ | 7000 | 120 | ○ | 0.60 |
| 20 | ⊚ | ○ | ○ | ⊚ | ⊚ | 7000 | 150 | ○ | 0.60 |

INDUSTRIAL APPLICABILITY

As described above, the resin composition for a platable substrate of the present invention is excellent in production stability such as moldability, dimensional stability, mechanical strength and plating properties, and is also environmentally friendly. Therefore, excellent plated parts having good thermal conductivity can be provided by forming a metal plating layer on a resin molded article obtained by molding the resin composition for a platable substrate using a plating treatment. Thus, the present invention is of great industrial significance.

The invention may be embodied in other specific forms without departing from the spirit or essential properties thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. Plated parts comprising a resin molded article produced by molding a resin composition for a platable substrate in which a metal plating layer is provided on at least a portion of a surface of the resin molded article, the resin composition for the platable substrate comprising:

100 parts by weight of a resin composition (C) comprising 10 to 60% by weight of a graft copolymer (A) prepared by graft polymerization of a rubber polymer (A1) and a monomer component (A2) containing an aromatic alkenyl compound monomer unit (a) and a vinyl cyanide compound monomer unit (b) and 40 to 90% by weight of another polymer (B), with the proviso that the total amount of the components (A) and (B) is 100% by weight, and 5 to 40 parts by weight of a phosphate ester flame retardant (D) having a molecular weight of 574 or more.

2. Plated parts according to claim 1, wherein the other polymer (B) is at least one kind selected from the group consisting of a copolymer (B-1) composed of a monomer component containing an aromatic alkenyl compound monomer unit (a) and a vinyl cyanide compound monomer unit (b), a polycarbonate resin (B-2), a polyamide resin (B-3) and a polyester resin (B-4).

3. Plated parts according to claim 1, wherein the content of the rubber polymer (A1) in the resin composition (C) is from 5 to 25% by weight and an average particle diameter of the rubber polymer (A1) is from 0.1 to 0.6 μm.

4. Plated parts according to claim 1, which further comprise an inorganic filler (E) in an amount of 0.1 to 50 parts by weight based on 100 parts by weight of the resin composition (C).

5. Plated parts according to claim 4, wherein the inorganic filler (E) is carbon fiber.

6. Plated parts according to claim 1, wherein the metal plating layer is formed by an electroplating treatment.

7. Plated parts according to claim 1, wherein the metal plating layer has a thickness of 5 μm or more.

* * * * *